(12) United States Patent
Warner et al.

(10) Patent No.: US 8,669,846 B2
(45) Date of Patent: Mar. 11, 2014

(54) WIRELESS DEVICES FOR PROCESS AUTOMATION AND VERIFICATION

(75) Inventors: Robert Warner, Holmdel, NJ (US); James Wang, San Marino, CA (US); Jack Winters, Middletown, NJ (US)

(73) Assignee: Eigent Technologies Inc., Holmdel, NJ (US)

( * ) Notice: Subject to any disclaimer, the term of this patent is extended or adjusted under 35 U.S.C. 154(b) by 1116 days.

(21) Appl. No.: 12/581,231

(22) Filed: Oct. 19, 2009

(65) Prior Publication Data

US 2011/0090052 A1    Apr. 21, 2011

(51) Int. Cl.
| | |
|---|---|
| *H04Q 5/22* | (2006.01) |
| *G08B 1/08* | (2006.01) |
| *G08B 26/00* | (2006.01) |
| *H01Q 11/02* | (2006.01) |
| *G01R 29/10* | (2006.01) |
| *H01Q 21/00* | (2006.01) |
| *H01Q 9/00* | (2006.01) |
| *H01Q 3/00* | (2006.01) |

(52) U.S. Cl.
USPC ............... 340/10.1; 340/539.1; 340/539.32; 340/539.21; 340/505; 340/539.23; 343/732; 343/703; 343/728; 343/751; 343/757

(58) Field of Classification Search
USPC ...................... 235/462.44; 705/7.31
See application file for complete search history.

(56) References Cited

U.S. PATENT DOCUMENTS

| | | | |
|---|---|---|---|
| 2001/0025244 A1* | 9/2001 | Kopp ........................... 704/275 |
| 2006/0167571 A1* | 7/2006 | Wu et al. ....................... 700/83 |
| 2006/0170565 A1* | 8/2006 | Husak et al. ............. 340/825.49 |
| 2006/0229928 A1* | 10/2006 | Nix, Jr. ........................... 705/9 |
| 2006/0238304 A1* | 10/2006 | Loving ....................... 340/10.1 |
| 2007/0265799 A1* | 11/2007 | Yamada ....................... 702/152 |
| 2008/0048835 A1* | 2/2008 | O'Toole et al. ............. 340/10.4 |
| 2008/0266110 A1* | 10/2008 | Hayford et al. ............ 340/572.8 |

* cited by examiner

*Primary Examiner* — Jennifer Mehmood
*Assistant Examiner* — Pameshanand Mahase
(74) *Attorney, Agent, or Firm* — Porzio, Bromberg & Newman, P.C.

(57) ABSTRACT

The present invention provides one or more powered wireless transceivers and/or one or more passive wireless transceivers, a reader and interrogator with variable power, one or more antennas connected to a human or robotic hand and/or foot, a method for making same and the method of using these devices for process automation and verification involving one or more items in addition to locating, tracking and identifying these items in a supply chain. In one embodiment, a proximity sensing wireless system is provided which can be used to step the handler or operator through the step of a process and verify that each step in the process has been completed.

10 Claims, 7 Drawing Sheets

WIRELESS DEVICES FOR PROCESS AUTOMATION AND VERIFICATION

BACKGROUND OF THE INVENTION

1. Field of the Invention

The present invention provides one or more powered wireless transceivers and/or one or more passive wireless transceivers, a reader/interrogator with variable transmission power, one or more reader/interrogator antennas connected to a human or robotic hand and/or foot, a method for making same and the method of using these devices for process control, automation, recording, and verification involving one or more items in addition to locating, tracking and identifying these items in the supply chain.

2. Description of Related Art

A radio-frequency identification (RFID) transceiver is a device that receives an electronic signal, generates a response signal, and then transmits the response signal with an identification code. RFID transceivers, generally affixed to individual merchandise palettes, individual shipping containers on a palette or individual items within a container, in a warehouse, in a storage facility, or on a retailer shelf, have been used to locate, identify and track these items in the supply chain by the interrogation of them with a fixed or hand-held reader/interrogator operated by an operator or programmed to operate automatically at specific locations such as at the entry or exit of a storage facility, at a check-out counter, or on the shelf.

Passive wireless transceivers (RFIDs) have been widely used commercially for supply chain management of merchandise. Conventionally available passive RFID transceivers employ a printed antenna on a strip of film/tape which can be attached to merchandise in a way similar to a strip of common adhesive tape. The size of a passive RFID is determined by the size of its antenna. Because of this relatively small form factor, passive RFID devices can be easily affixed to any object. Readers or interrogators are generally realized as handheld devices or fixed devices with patch or panel antennas.

The focus of conventional tracking methods and technology has been on the use of RFIDs for the inventorying of individual merchandise palettes, individual shipping containers, and individual items within a container, in a warehouse, in a storage facility, on a retailer shelf, or in use by an end user. It is desirable to provide RFID devices and readers/interrogators that can be used to control and police the operational steps that must be taken to successfully complete a task and verify that all required steps were taken in completing the task.

SUMMARY OF THE INVENTION

The present invention provides one or more powered wireless transceivers and/or one or more passive wireless transceivers, one or more readers and interrogators with variable transmission power, one or more probe antennas connected to a human or robotic hand and/or foot in a non-intrusive way, a method for making same and a method of using these devices for process automation, recording, and verification involving one or more items, in addition to locating, tracking and identifying these items in the supply chain.

The present invention can be generally applied to recognizing, monitoring, and controlling the interaction between humans, robots or machines within an environment or with specific objects for performing chores, specific tasks, or operations. Such control, verification, recording, and automation of interactions are accomplished through the use of a non-intrusive form of reader, interrogator and antenna probes, its communication with the passive or powered wireless transceivers, and an intelligent software system resident in the reader and interrogator or in a central computer networked to the reader or interrogator.

The use of wireless transceivers and reader and interrogators in this manner can be enhanced or improved by adjusting the transmission power of the reader and interrogator, by incorporating temperature, pressure, acceleration, or location sensors into the wireless transceivers and operating the wireless transceiver devices in conjunction with these sensors, or through the use of visual, audio, mechanical or electrical feedback to the operator or handler in response to the processed actions between reader and interrogator and the wireless transceiver devices or between humans, robots or machines and their environment and/or specific objects.

The present invention provides that the logging or recording of operational steps and tasks, which was previously either manually written down or entered into a computer, can now be automatically recorded by a reader and interrogator by simply processing the reader and interrogator queries and responses and feedback information from the wireless transceiver devices with associated time stamps. The control and policing of these operational steps and tasks can be done either once or periodically with some specified frequency, at one or more selected times, and at one or more selected locations, using the same or different RFID wireless transceiver devices.

In general, it is conventionally desirable that the communication range between a reader and interrogator and a wireless transceiver such as an RFID device be as large as possible. Typically, it is desirable to increase the range of RFID products. The present invention takes advantage of the limited range of these systems and, in fact, in some situations, further reduces the range to a minimum performance level.

One aspect of the present invention is to provide process control and verification to an operator or robot performing a set of tasks following certain pre-determined procedures. In one embodiment, the present invention provides a variable transmission power reader and interrogator connected to one or more antenna probes attached to the wrist or ankle and/or hand or foot of a human or robotic operator, while at the same time freeing the human or robotic operator's hand or foot to do other tasks. The antenna probes are designed to be compact, lightweight, and can be flexible such that their attachment to human or robotic operator hand or foot does not obstruct or interfere with their other required actions. Such a non-intrusive arrangement of the antenna probe(s) allows the operator or handler to perform its tasks normally. The reader and interrogator can detect passive or powered wireless transceivers in proximity with an adequately precise measurement of distance by performing multiple reads in sequence during an interval, adjusting its transmission power through software of the interrogator with different reads, detecting multiple wireless transceiver devices affixed to one or more objects with known relative locations, through the use of multiple antenna probes with different orientations, and by processing the composite of the reading information in software in conjunction with a priori knowledge of the task(s) to be performed. Since all wireless transmissions need to handle unreliable transmissions due to fading, blockage, or other channel conditions, the processing of this information reduces the chance of making a wrong decision. In addition, various passive or powered wireless transceivers can be affixed strategically to selected objects or locations on objects to increase the reliability of the detection. As the operator follows certain procedures to perform certain tasks, the reader can detect one or more passive or powered devices at some approximate distance and direction and at given times by sensing the motion of the handler or operator interacting with the objects during the handling process and recognizing the action of the handler or operator. A reader and interrogator is typically equipped with a microprocessor and on-board memory which allows the reader and interrogator to store the detected wireless transceiver devices ID, time stamp, and an approximate distance and orientation of the wireless transceiver relative to the antenna probes. A reader and interrogator equipped with pre-installed or pre-programmed software with a series of steps, procedures, or routines, or with some artificial intelligence and knowledge of required steps or procedures, can perform the monitoring, verifying, and policing of the handling process. It is also possible to network the reader and interrogator to a central processing unit where routines or procedures are pre-installed or pre-programmed to perform the monitoring, verifying, and policing of the handling process.

In order to ensure that a certain step or routine is correctly followed, the operator or handler can be provided an audible or visual confirmation after each such step has been detected and/or recorded.

It is possible to incorporate a variety of sensors into the wireless transceiver device. Examples include, but are not limited to, temperature, humidity, pressure, magnetic, position, rate, angular, tilt, acceleration, and location sensors. The wireless transceiver can provide such sensor data to the reader and interrogator during the query process. Based on the environmental conditions or measured sensor data, it can be determined whether a routine or procedure to be performed by the operator or handler should be adapted or changed. Some of the sensors can also be used to enhance the reader and interrogator detection. It is also possible to incorporate sensors into the reader and interrogator for monitoring and recording sensor data.

The present invention can be used for locating, identifying and tracking each individual item and the completed task item throughout the logistics process.

The present invention can provide benefits which include, but are not limited to, the following: monitoring and verifying that the operator performed the procedure or routine completely and properly; providing some indicator or feedback such as an audible tone, a visual indicator such as an lighted LED, or a recorded or synthesized voice to indicate a successful task or a task with a procedural error; recording the ID of the operator or handler, the ID items being handled, and the location and time stamp of the steps that are performed; and guiding or training an inexperienced operator or handler such that certain routines or procedures are correctly followed by the operator or handler now and in the future.

This proximity sensing technique can be used with conventional readers and interrogators which conform to EPCglobal, ISO or other standard specifications. Such commercial readers and interrogators generally provide antenna ports for the connection of wearable or compact antenna probes. Application firmware can be uploaded into the readers and interrogators or reside in a central processing unit which interfaces to the readers or interrogators.

The invention will be more fully described by reference to the following drawings.

DETAILED DESCRIPTION

Figure 1:
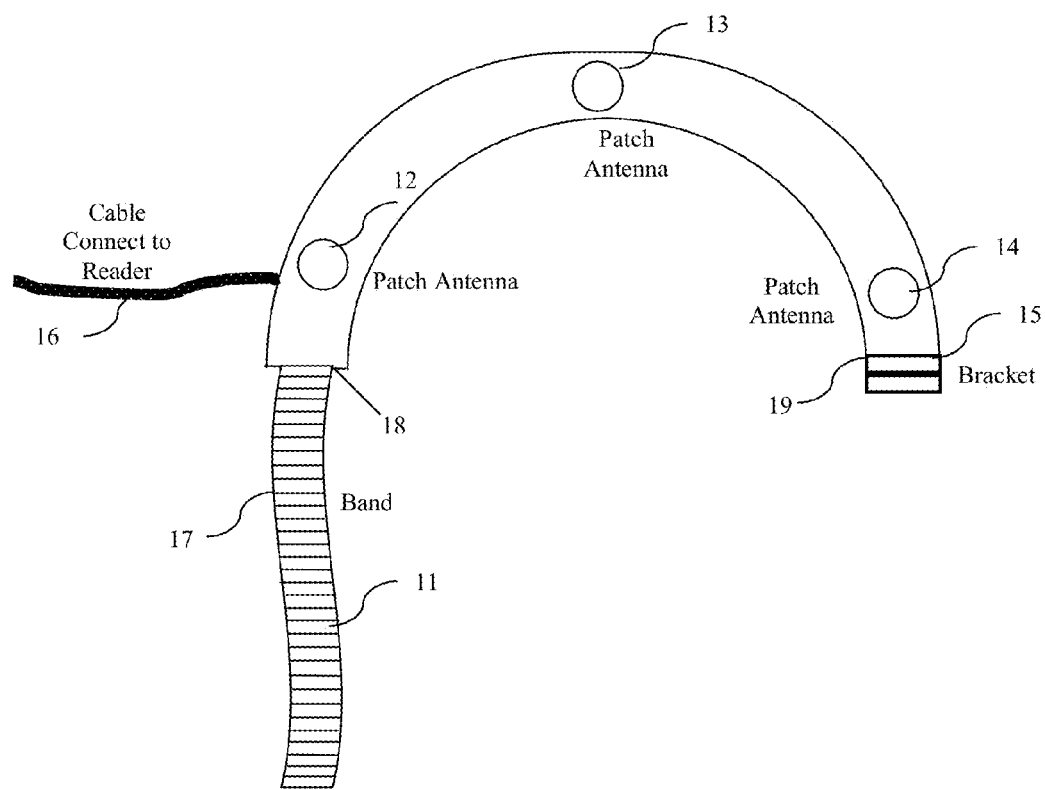
FIG. 1 is a schematic diagram of an embodiment of an antenna probe in accordance with the teachings of the present invention which can be attached to human or robotic wrist or foot.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 shows an embodiment of antenna probe 10 which can be attached to human or robotic wrist or foot. Patch antennas 12, 13, and 14 are coupled to band 11. Band 11 includes corrugated portion 17 at end 18. Bracket 15 is attached to other end 19 of band 11. Corrugated portion 17 is inserted bracket 15 for securing band 11 to the wrist or foot of a user. Connecting cable 16 can be used for attaching antenna probe 10 to a reader. Another embodiment is to use a printed antenna on a flexible substrate which can be attached to a human or robotic wrist or foot.

Figure 2A:
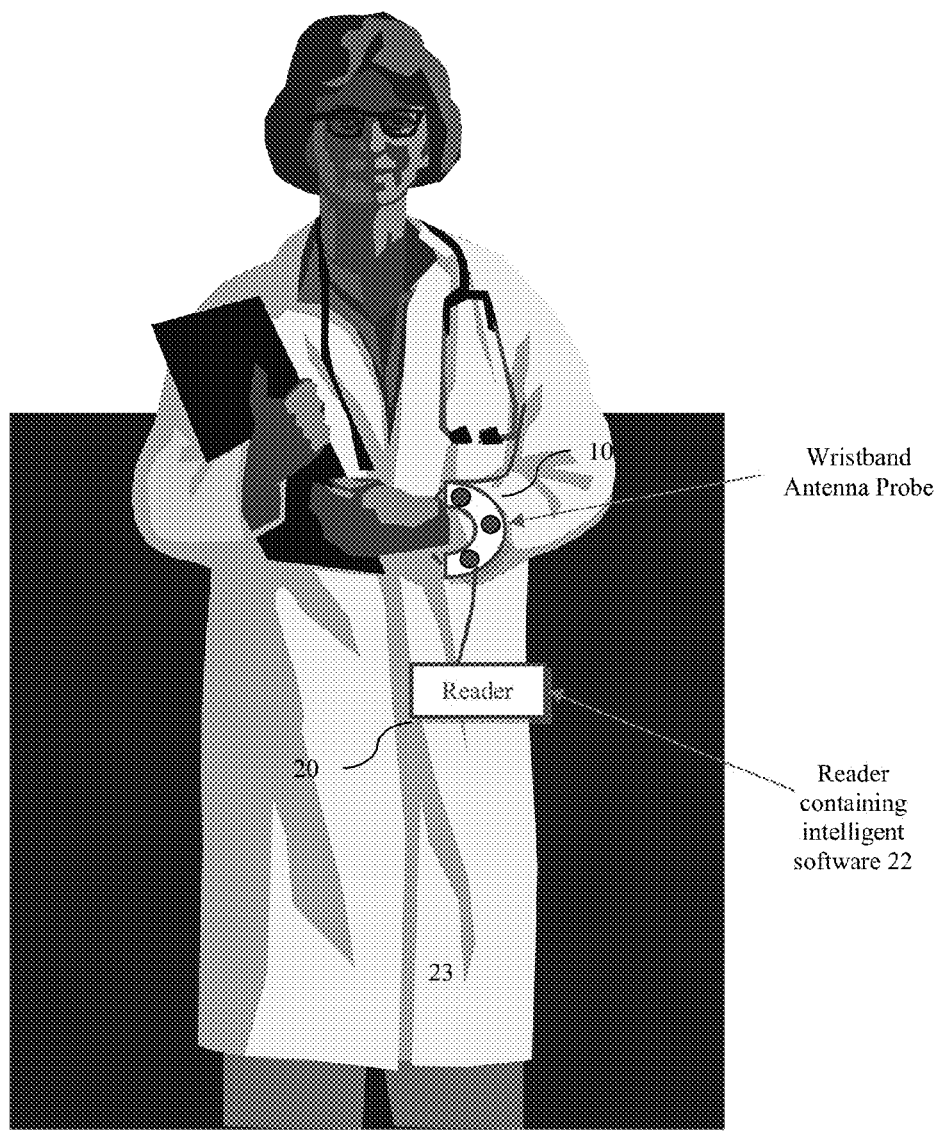
FIG. 2A is a schematic diagram of a reader and interrogator connected to antenna probes, the reader and interrogator including intelligent control software adapted for attachment to a human.
Figure 2B:
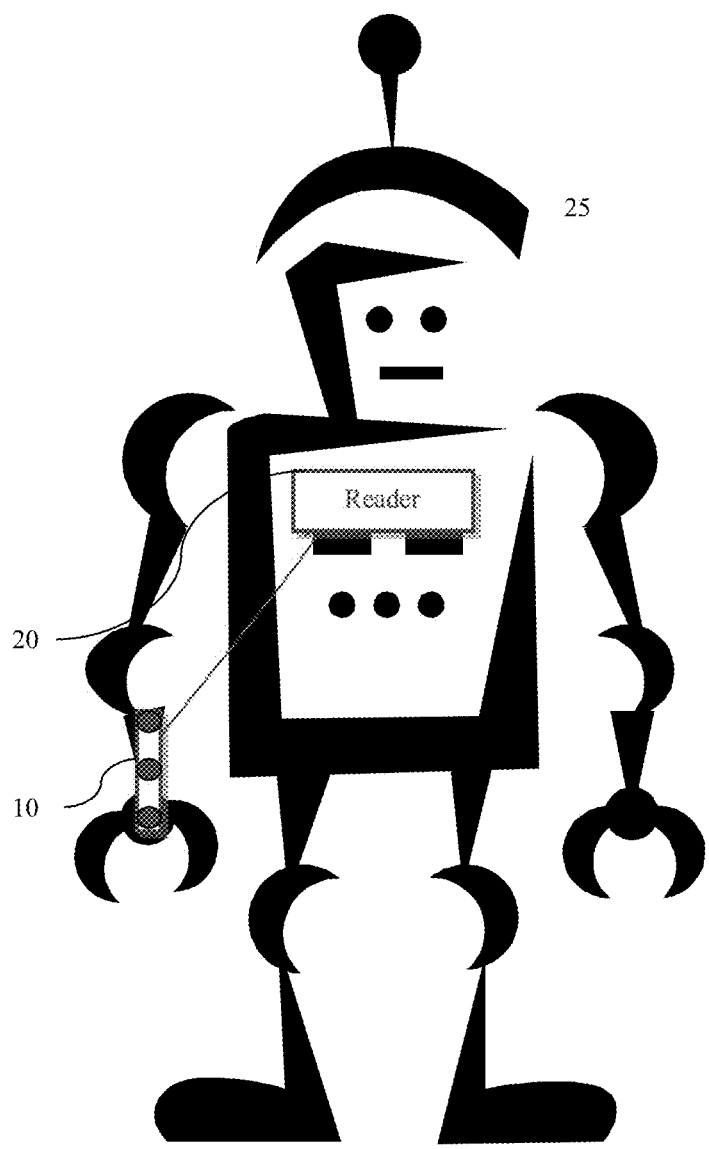
FIG. 2B is a schematic diagram of a reader and interrogator connected to antenna probes, the reader and interrogator including intelligent control software adapted for attachment to a robot.

FIG. 2A is a schematic diagram of reader 20 connected to antenna probe 10 adapted for attachment to human 23. Interrogator control software 22 is located in reader 20 for providing interrogation functions. Reader 20 can be a reader and interrogator equipped with a microprocessor and on-board memory which allows the reader and interrogator to store the detected wireless transceiver device's ID, time stamp, and an approximate distance and orientation of the wireless transceiver relative to the antenna probes. Interrogator control software can include a series of steps, procedures, or routines, or with some artificial intelligence and knowledge of required steps or procedures, can perform the monitoring, verifying, and policing of the handling process. FIG. 2B is a schematic diagram of reader 20 connected to antenna probe 10 adapted for attachment to robot 25.

Figure 3:
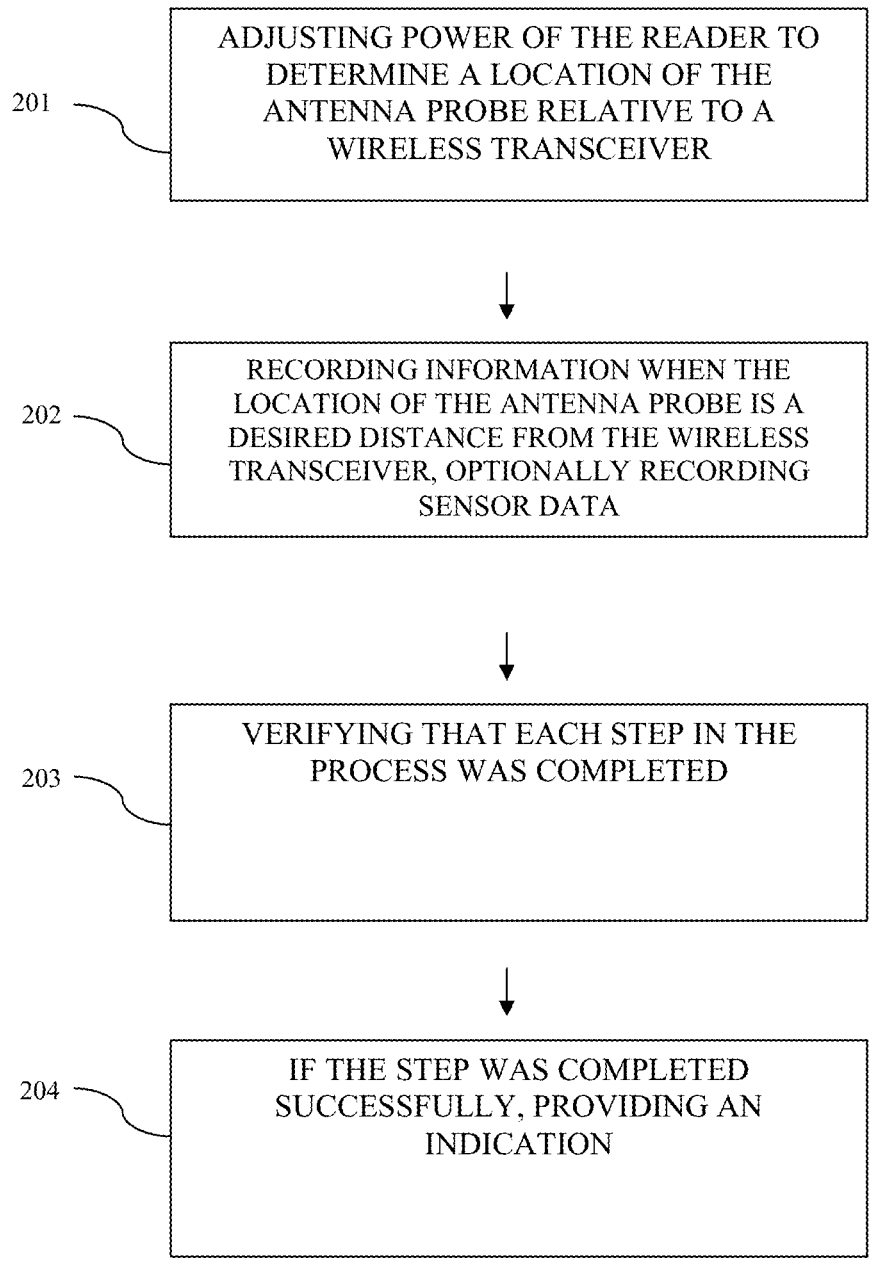
FIG. 3 is a flow diagram of a method for antenna tracking and verification of a process using antenna probe.

FIG. 3 is a flow diagram of a method for antenna tracking and verification of a process using antenna probe 10. In block 201, the power of the reader is adjusted to determine a location of the antenna probe relative to a wireless transceiver. In block 202, information is recoded when the location of the antenna probe is a desired distance from the wireless transceiver. One or more sensors can be associated with the transceiver and the sensor data can be optionally recorded. For example, the recorded information can include an identification of probe associated with the human or robot, an identification of the wireless transceiver, a location of the wireless transceiver, a time stamp of the wireless transceiver and sensor data from the wireless transceiver. In block 203, each step of the process is verified when the step is completed. In block 204, if the step was completed successfully, an indication is provided. The indication can include an audible or visual confirmation, for example, being displayed or announced at antenna probe 10.

Figure 4:
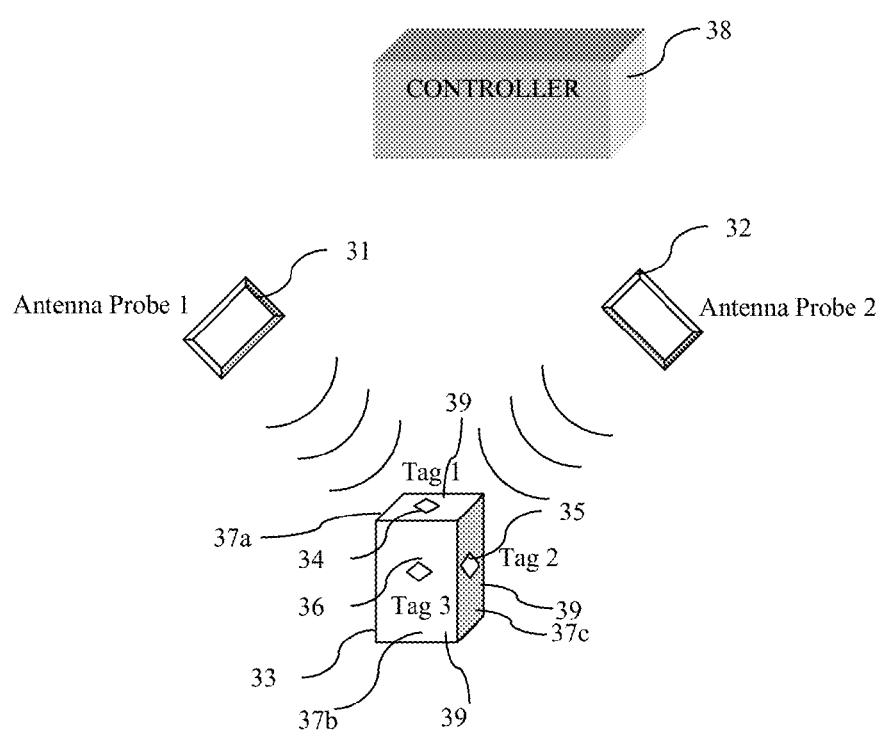
FIG. 4 is a schematic diagram of two antenna probes used with a box with three tags.

FIG. 4 is a schematic diagram of system 30 including two antenna probes 31 and 32 used with box 33. Antenna probes 31 and 32 communicate with RFID tags 34, 35 and 36. RFID tags 34, 35 and 36 are positioned on respective sides 37a-37c of box 33. Controller 38 receives information from antenna probe 31 and antenna probe 32. For example, antenna probes 31 and 32 can provide information directed to an identification of the RFID tag and an associated time stamp. Controller 38 can be used to vary the power of the readers associated with antenna probes 31 and 32. Controller 38 can be a central processing unit where routines or procedures are pre-installed or pre-programmed to perform the monitoring, verifying, and policing of the handling process. RFID tags are wireless transceivers. One or more sensors 39 can be associated with box 33 and/or RFID tags 34, 35 and 36. For example, sensor 39 can include temperature, humidity, pressure, magnetic, position, rate, angular, tilt, acceleration, and location sensors.

Figure 5:
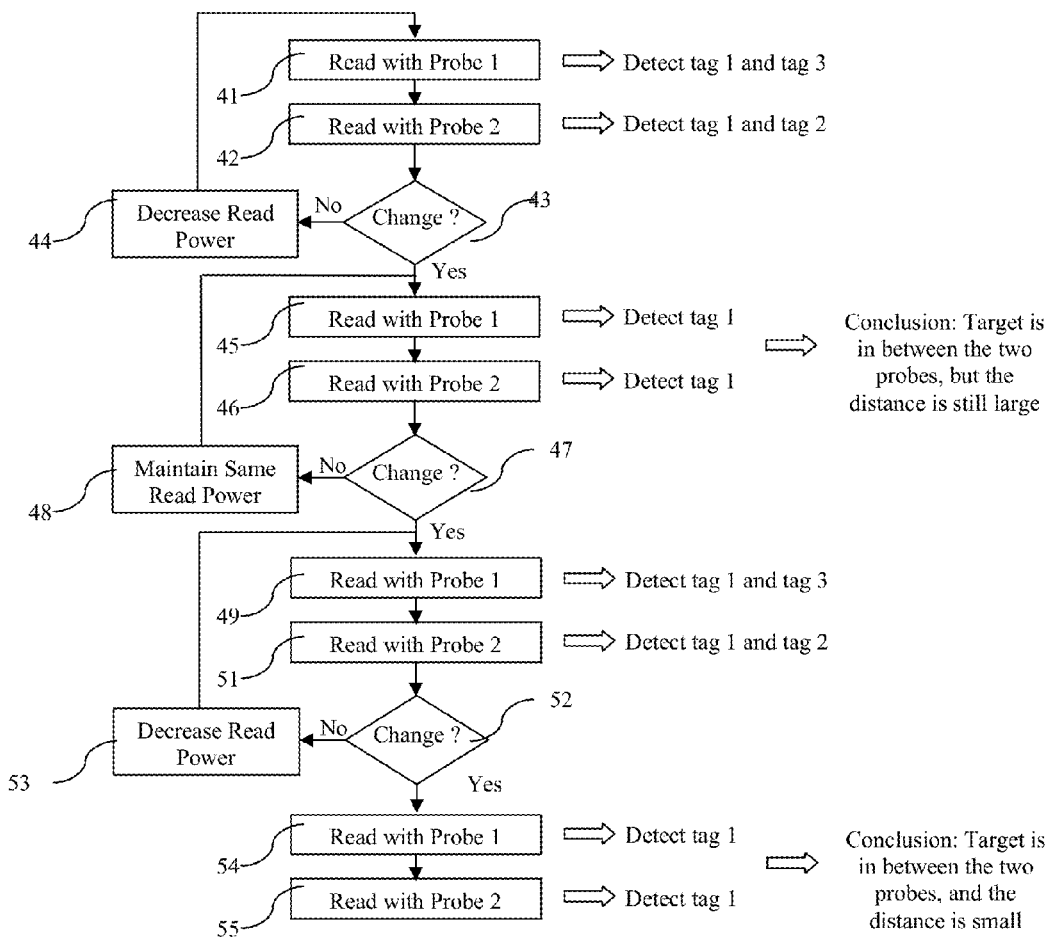
FIG. 5 is a flow diagram which can be used with FIG. 3.

FIG. 5 shows an example method 40 for use with system 30 which includes using variable transmission power, multiple reads, multiple probes, and multiple RFID devices placed in strategic positions to enhance detection of objects or distance measurements. In this example, the antenna probes 31 and 32 are initially far away from box 33. Antenna probes 31 and 32 can be similar to antenna probe 10. In step 41, antenna probe 31 reads RFID tags 34 and 36, but not RFID tag 35, since it is on the other side 37b of box 33 from antenna probe 31. In step 42, antenna probe 32 reads RFID tags 34 and 35, but not RFID tag 36, since it on the other side 37b of box 33 from antenna probe 32. In step 43, controller 38 checks for a change from the previous probes with antenna 31 and antenna 32, but because this is the first probe no change is indicated. Controller 38 signals to interrogator control software 22 and the read power for antenna probes 31 and 32 is then decreased in step 44. Steps 41 and 42 are repeated with the power of antenna probes 31 and 32 decreased in step 44 until only RFID tag 34 is seen by both antenna probes 31 and 32. In this case, antenna probes 31 and 32 repeatedly probe box 33 with the same read power until a change in the result of the probe readings from antenna probe 31 and antenna probe 32 is detected in step 47. In this case, when antenna probe 31 detects RFID tags 34 and 36, and antenna probe 32 detects RFID tags 34 and 35, this indicates that antenna probes 31 and 32 are now closer to box 33. In step 49, antenna probe 31 reads RFID tags 34 and 36, and in step 51, antenna probe 32 reads RFID tags 34 and 35. Step 52 detects if the detected RFID tags have changed. If the detected RFID tags do not change, the read power of antenna probes 31 and 32 is decreased in step 53. Blocks 49-53 are repeated until only tag 34 is read by both antenna probes 31 and 32, indicating that RFID tag 32 is between antenna probes 31 and 32, and is close by.

Figure 6:
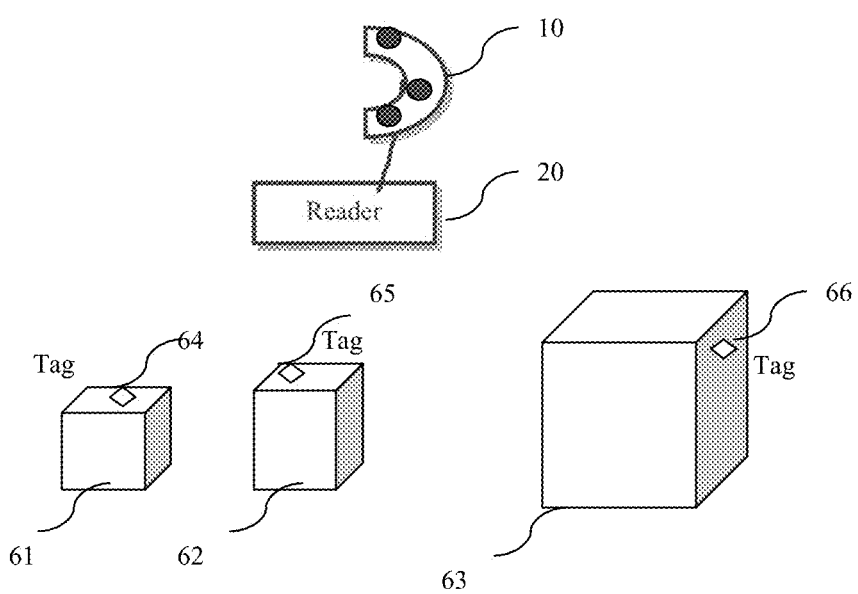
FIG. 6 is a schematic diagram of an embodiment of proximity sensing wireless network of the present invention with a plurality of boxes and a wrist band/reader.

FIG. 6 is a schematic diagram of an embodiment of proximity sensing wireless network 100 of the present invention with three boxes 61, 62, and 63, that are to be manipulated by an operator wearing antenna probe 10 and reader 20. In this example, box 61 is to be placed on top of box 62 and both boxes are to be packed inside box 63. RFID tags 64, 65, and 66 are positioned on boxes 61, 62, and 63, respectively. The operator uses reader 20, connected to antenna probe 10, which registers when the operator interacts with the items. Reader 20 can be a low power reader. When the operator is near RFID tag 64, reader 20 and interrogator control software 22 register that the operator is picking up box 61. When box 61 is placed on top of box 62 with RFID tag 65, reader 20 and interrogator control software 22 register that the operator is near box 61 and box 62, with box 61 on top of box 62. When box 61 and box 62 are placed into box 63 with RFID tag 66, and the operator is nearby, reader 20 and interrogator control software 22 register that the boxes are very close to each other and therefore the task has been completed.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A method for automatic tracking and verifying of a process using a proximity sensing system, said system comprising a reader and a plurality of antenna probes located on a human and a plurality of wireless transceivers located on an item or at a location used in the process, and said method comprising the steps of:
    adjusting the power of said reader to determine a location of the antenna probe located on the human relative to the wireless transceiver, and
    recording when the location of the antenna probe located on the human is a desired distance from the wireless transceiver, thereby locating and tracking the wireless transceiver in the process wherein the step of adjusting the power of the reader is performed by the steps of:
    (a) reading at the reader the plurality of the wireless transceivers positioned at different locations on the item using the plurality of the antenna probes;
    (b) detecting one or more of the wireless transceivers by each of the antenna probes and determining if the wireless transceivers detected by each of the antenna probes are different; and
    (c) if the wireless transceivers detected by each of the antenna probes are different, decreasing a transmit power of the reader of each of the antenna probes and repeating steps (a) and step (b) until only one wireless transceiver is detected by the antenna probe.

2. The method of claim 1 further comprising providing an indicator to the human of whether each of the steps in the process was competed successfully.

3. The method of claim 1 further comprising recording one or more of an identification of the antenna probe located on the human and an identification of the wireless transceiver.

4. The method of claim 1 wherein the recording step further comprises recording the location of the wireless transceivers at each of the steps in the process, and a time stamp from the wireless transceiver at each of the steps in the process.

5. The method of claim 1 further comprising the step of:
    reading sensor data from the wireless transceiver and using the sensor data to enhance verification of the process.

6. A method for automatic tracking and verifying of a process using a proximity sensing system, said system comprising a reader and an antenna probe located on a robot and a wireless transceiver located on an item or at a location used in the process, and said method comprising the steps of:
    (a) adjusting the power of said reader to determine a location of the antenna probe located on the robot relative to the wireless transceiver,
    (b) recording when the location of the antenna probe located on the robot is a desired distance from the wireless transceiver thereby locating and tracking the wireless transceiver in the process wherein step (a) and step (b) are repeated for a plurality of tasks and verifying that each of the steps (a) and (b) in the process has been completed.

7. The method of claim 6 further comprising recording one or more of an identification of the antenna probe located on the robot and an identification of the wireless transceiver.

8. The method of claim 6 wherein the recording step further comprises recording the location of the wireless transceivers at each of the steps in the process and a time stamp from the wireless transceiver at each of the steps in the process.

9. The method of claim 6 further comprising the step of:
reading sensor data from the wireless transceiver and using the sensor data to enhance verification of the process.

10. A method for automatic tracking and verifying of a process using a proximity sensing system, said system comprising a reader and a plurality of antenna probes located on a human and a plurality of wireless transceivers located on an item or at a location used in the process, and said method comprising the steps of:
adjusting the power of said reader to determine a location of the antenna probe located on the human relative to the wireless transceiver, and
recording when the location of the antenna probe located on the human is a desired distance from the wireless transceiver, thereby locating and tracking the wireless transceiver in the process wherein the step of adjusting the power of the reader is performed by the steps of:

(a) reading at the reader the plurality of wireless transceivers positioned at different locations on the item using the plurality of the antenna probes;

(b) detecting one or more of the wireless transceivers by each of the antenna probes and determining if the wireless transceivers detected by each of the antenna probes are different; and (c) if the wireless transceivers detected by each of the antenna probes are different, decreasing a transmit power of said reader and repeating steps (a) and step (b) until only one wireless transceiver is detected by the antenna probes.

* * * * *